United States Patent [19]
Abe

[11] Patent Number: 4,744,211
[45] Date of Patent: May 17, 1988

[54] DETACHABLE CHAIN AND METHOD OF PRODUCING THE SAME

[75] Inventor: Tetuo Abe, Kitakyushu, Japan

[73] Assignee: Hitachi Metals, Ltd., Tokyo, Japan

[21] Appl. No.: 832,395

[22] Filed: Feb. 24, 1986

[30] Foreign Application Priority Data

Feb. 25, 1985 [JP] Japan .................................. 60-36084

[51] Int. Cl.⁴ ........................ B22D 25/02; F16G 15/04
[52] U.S. Cl. ........................................... 59/85; 59/78; 198/850; 198/853; 148/139; 148/141; 420/13
[58] Field of Search ........................... 59/85, 84, 78, 5; 198/850, 851, 852, 853; 420/13, 9; 148/321, 139, 141, 3

[56] References Cited

U.S. PATENT DOCUMENTS

| | | | |
|---|---|---|---|
| 3,986,602 | 10/1976 | Dretzke | 59/85 |
| 4,123,947 | 11/1978 | Smith et al. | 59/9 |
| 4,541,878 | 9/1985 | Muhlberger et al. | 148/139 |
| 4,596,606 | 6/1986 | Kovacs et al. | 148/321 |

FOREIGN PATENT DOCUMENTS

| | | | |
|---|---|---|---|
| 2853870 | 7/1980 | Fed. Rep. of Germany | 148/321 |
| 127747 | 10/1981 | Japan | 148/321 |
| 110843 | 6/1985 | Japan | 148/321 |
| 110841 | 6/1985 | Japan | 148/321 |
| 753923 | 8/1980 | U.S.S.R. | 148/321 |
| 1143782 | 3/1985 | U.S.S.R. | 148/321 |

OTHER PUBLICATIONS

"Approaching Austempered Ductile Iron Properties by Controlled Cooling in the Foundry", Janowak & Gundlach, Jun. 1985, pp. 25–31.
"Elements of Material Science", Lawrence Vlack, Apr. 1967 pp. 327, 328.
"Processes and Material of Manufacture" Roy Lindberg, Mar. 1969, pp. 70 and 71.
"Metals Handbook" ASM Handbook Committee 1964, pp. 210, 212, and 216.
"Metals Handbook" Metals Handbook Committee 1948, pp. 520 and 521.

*Primary Examiner*—David Jones
*Attorney, Agent, or Firm*—Finnegan, Henderson, Farabow, Garrett & Dunner

[57] ABSTRACT

A detachable chain composed of chain links is broadly used as a conveyor chain with attachments for various kinds of articles to be conveyed, or as a power transmitting chain. The conventional chain of this type, however, could convey only light load when used as a conveyor chain and could run only at a low speed when used as a power transmitting chain. This invention provides a detachable chain improved both in the rupture strength and service life, as well as a method of producing the same.

2 Claims, 4 Drawing Sheets

×400

×400

DETACHABLE CHAIN AND METHOD OF PRODUCING THE SAME

BACKGROUND OF THE INVENTION

The present invention relates to a detachable chain and method of producing the same.

Referring to FIG. 1, a typical detachable chain is generally designated at a reference numeral 1. The detachable chain 1 is provided at its one end with a pin and at its other end with a barrel 3. The pin 2 and the barrel 3 are connected to each other through side links 4. The barrel 3 is provided with a hook 5 which extends transversely of the barrel 3. A notch 6 is provided in one end of the pin 2. The pin 2 is detachably inserted into the hook 5 from the side of the notch 6. The pin, however, does not come off the hook 5 during the operation of the detachable chain.

The chain is simple both in construction and handling and, therefore, is broadly used as a power transmitting chain or conveyer chain with fittings for conveying various articles.

The conventional detachable chain is usually made of black heart malleable cast iron so that the strength thereof is often insufficient. Therefore, this conventional detachable chain is only able to bear a light load when used as a conveyor chain and can only run at low speeds when used as a power transmitting chain.

SUMMARY OF THE INVENTION

Accordingly, an object of the invention is to provide a detachable chain having an improved rupture load and a reduced weight, as well as improved service life, as compared with the conventional detachable chain made of black heart malleable cast iron.

Another object is to provide a method of producing such a detachable chain.

To this end, according to an aspect of the invention, there is provided a detachable chain having chain links of an integrated construction produced by casting, characterized in that the link of said chain is made of a nodular graphite cast iron having a matrix constituted by a mixture structure of bainite and austenite.

According to another aspect of the invention, there is provided a method of producing detachable chain having chain links of an integrated construction, comprising the steps of: forming the link of said detachable chain by casting from nodular graphite cast iron; heating said chain link at 830° to 900° C. for 0.5 to 3 hours; and subjecting the same to an austemper treatment which comprises quenching the chain link down to 200° to 400° C. and holding the same for a period not shorter than 0.5 hour after holding the chain link at 830°–900° C. for 0.5-3 hours; whereby a matrix having a mixture structure of bainite and austenite is obtained.

The above and other objects, features and advantages of the invention will become clear from the following description of the preferred embodiment when the same is read in conjunction with the accompanying drawings.

DESCRIPTION OF THE PREFERRED EMBODIMENTS

A description will be made hereinunder as to an embodiment of the method of the invention for producing a detachable chain.

The material composition of the link of the detachable chain embodying the invention is the same as nodular graphite cast iron which is known per se, so that detailed description in this connection will be omitted. Roughly speaking, however, the material has a composition containing 3.5 to 3.7 wt % of C, 2.0 to 2.3% of Si, 0.3 to 0.4 wt % of Mn, not more than 0.3 wt % of P, not more than 0.01 wt % of S, and 0.03 to 0.05 wt % of Mg.

According to the method of the invention, a chain link made of a nodular graphite cast iron having an ordinary composition is subjected to austenitizing treatment comprises holding the detachable chain link at 830° to 900° C. for 0.5 to 3 hours, subjecting the detachable chain link to a bainite transformation treatment which comprises quenching the detachable chain link by immersion in a salt bath or fluidized bed of 200° to 400° C. for a period of time not shorter than 30 minutes, and cooling the detachable chain link to room temperature.

An explanation will be made hereinunder as to the reasons for the limitation of the austemper treatment. The above-mentioned austenitizing conditions comprises heating at 830° to 900° C. for 0.5 to 3 hours. A heating at a temperature below 830° C. requires an impractically long period of time for austenitizing particularly when having a large wall thickness. A heating at a temperature above 900° C. undesirably makes the austenite crystal grains coarse, resulting in reduced strength.

The heating period of time may vary in dependence on the wall thickness of the chain link. The minimum time required for austenitizing, however, is 0.5 hour when the wall thickness is small and 3 hours is enough even when the wall thickness is large.

On the other hand, the above-mentioned isothermal transformation treatment condition comprises heating at 200° to 400° C. for a period of time not shorter than 0.5 hour. A heating at a temperature below 200° C. undesirably increases hardness and reduces the toughness, while a heating at a temperature above 400° C. does not bring about the increase in wear resisting property while resulting in a rise in costs due to wasteful use of heating energy.

The invention will be more fully understood from the following description of Examples.

EXAMPLE 1

(1) Chemical Composition

Figure 1:
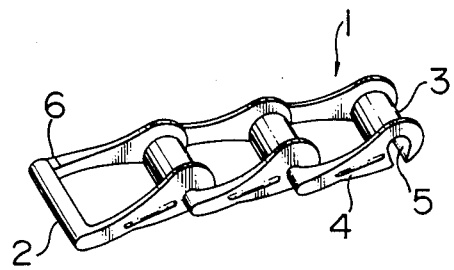
FIG. 1 is a perspective view of a detachable chain embodying the invention.

A detachable chain link of the integrated construction type shown in FIG. 1 was produced from a material consisting of the constituents shown in the following Table 1, iron, and incidental impurities. The pouring temperature was between 1,400° and 1,420° C.

TABLE 1

| C | Si | Mn | P | S | Cu | Mo | Mg (wt. %) |
|---|----|----|---|---|-----|-----|----|
| 3.68 | 2.13 | 0.43 | 0.025 | 0.012 | 0.51 | 0.32 | 0.042 |

(2) Heat Treatment

The detachable chain link thus produced was held at 870° C. for 2 hours, and was quenched down to 380° C. and held at this temperature for 1 hour, followed by air cooling.

(3) Mechanical Properties

The mechanical properties of the detachable chain link obtained after the series of treatment mentioned above are shown in the following Table 2.

TABLE 2

| Tensile strength (kgf/mm$^2$) | Proof stress (kgf/mm$^2$) | Elongation (%) | Hardness HV |
|---|---|---|---|
| 99.1 | 74.5 | 10.7 | 27.3 |

(4) Structure

Figure 2:
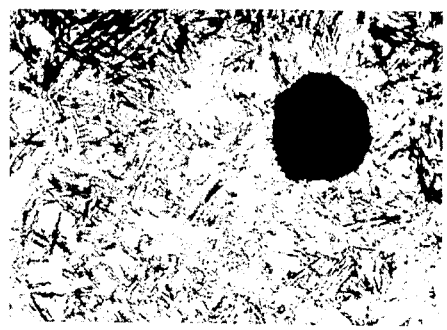
FIG. 2 is a photograph of a microstructure of the link of the chain of FIG. 1.

FIG. 2 is a photograph of microstructure (magnification 400) of the detachable chain link finished in accordance with the production method of the invention. It will be seen that a good matrix having a bainite-austenite mixture structure has been attained.

(5) Rupture Strength Test

Three pieces of the chain link in accordance with the invention were connected in series to form a chain which was then subjected to a rupture strength test. The result of the test is shown in the following Table 3.

TABLE 3

| Sample No. | Rupture load (kg) | Mean rupture load (kg) |
|---|---|---|
| 1 | 11,170 | |
| 2 | 10,660 | |
| 3 | 11,240 | |
| 4 | 10,870 | |
| 5 | 10,690 | 10,890 |
| 6 | 10,680 | |
| 7 | 10,730 | |
| 8 | 10,820 | |
| 9 | 10,780 | |
| 10 | 11,260 | |

It was confirmed that a conventinal detachable chain (#124) made of black heart malleable cast iron (FCMB32) and having the same shape as the chain of the invention shows a mean rupture strength on the order of 5,400 kg. Thus, the chain of the invention has a strength which is twice or more that shown by the conventional chain.

(6) Wear Test

Figure 3:
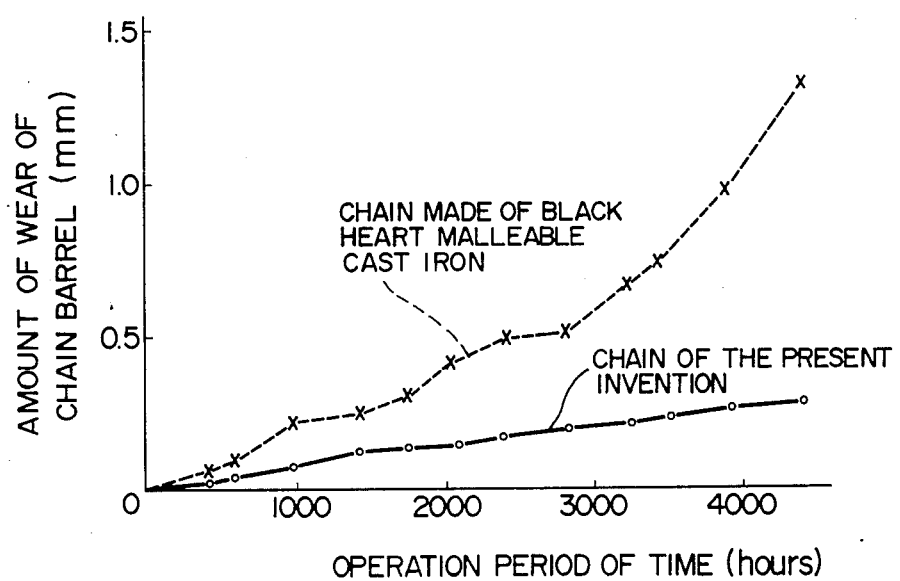
FIG. 3 is a graph showing the result of a wear test.

A test was conducted to compare the chain of the invention with the conventional chain composed of chain links made from black heart malleable cast iron, as to the amount of wear of the barrel during continuous operation of the chain. FIG. 3 shows the result of this test. It will be seen from this Figure that the product of the invention has a superior wear resistance.

EXAMPLE 2

An explanation will be made hereinunder as to an example of the chain composed of the detachable chain link of the invention applied to water treatment, particularly to a sedimentation basin for a sewage treating system.

(1) Chemical Composition

Figure 6:
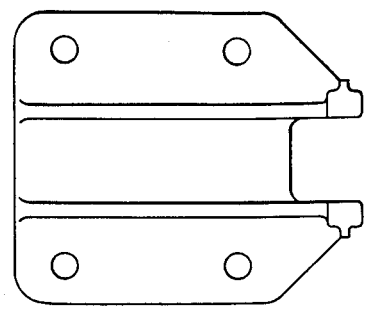
FIG. 6 is a sectional view taken along the line A—A of FIG. 4.
Figure 4:
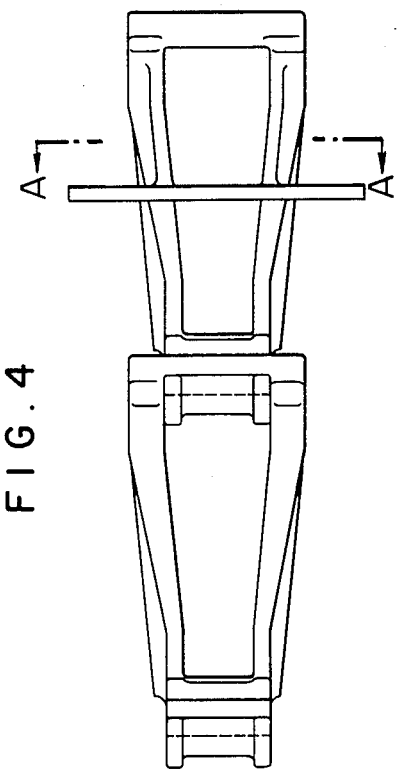
FIG. 4 is a plan view of another detachable chain for water treatment, embodying the invention.
Figure 5:
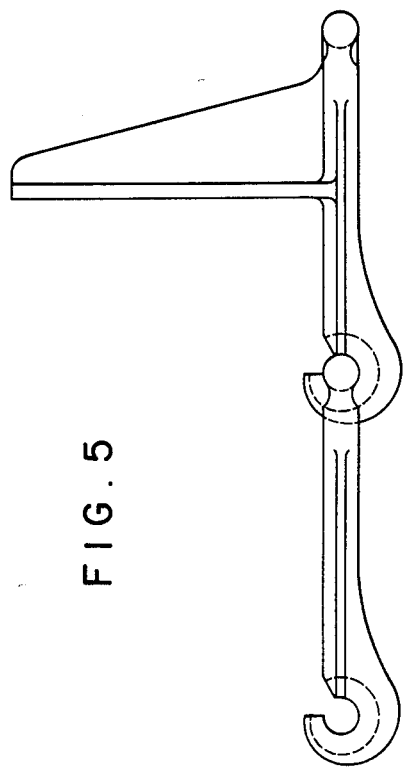
FIG. 5 is a side elevationa view of the chain of FIG. 4.

Chains as shown in FIGS. 4, 5 and 6 were produced from a material consisting of constituents shown in Table 4, iron and incidental inpurities. The pouring temperature of a melt was 1,400° to 1,420° C.

TABLE 4

| C | Si | Mn | P | S | Cu | Mo | Mg (wt. %) |
|---|----|----|---|---|-----|-----|----|
| 3.66 | 2.14 | 0.42 | 0.028 | 0.012 | 0.52 | 0.30 | 0.042 |

(2) Heat Treatment

The thus obtained chain link made of nodular graphite cast iron was held at 870° C. for 2 hours, and was quenched down to 380° C. The chain was then held at this temperature for one hour followed by air cooling.

(3) Mechanical Properties

The mechanical properties of the heat-treated chain link is shown in Table 5 below.

TABLE 5

| Tensile strength (kgf/mm$^2$) | Proof stress (kgf/mm$^2$) | Elongation (%) | Hardness (HV) |
|---|---|---|---|
| 99.6 | 74.7 | 10.5 | 274 |

(4) Structure

Figure 7:
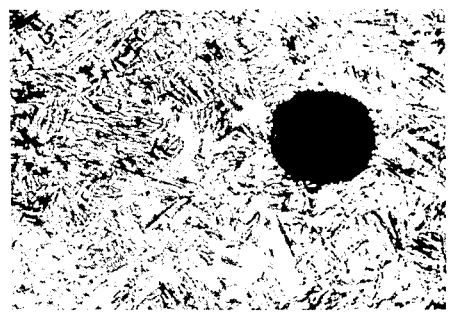
FIG. 7 is a photograph of a microstructure of the link thereof.

FIG. 7 shows the metallurgical microscopic photo (magnification 400) of the structure of this chain link. From this Figure, it will be seen that chain link of the invention has a good matrix having a mixture structure of bainite and austenite.

(5) Rupture Strength

Three pieces of chain links of the invention were connected to form a chain which was subjected to a rupture strength test. The result of this test is shown in Table 6.

TABLE 6

| Sample No. | Rupture strength (kg) | Mean rupture strength |
|---|---|---|
| 1 | 11,370 | |
| 2 | 10,570 | |
| 3 | 11,830 | |
| 4 | 10,440 | |
| 5 | 11,290 | 10,902 |
| 6 | 10,550 | |
| 7 | 10,490 | |
| 8 | 11,350 | |
| 9 | 10,480 | |
| 10 | 10,650 | |

(6) Wear Test

Figure 8:
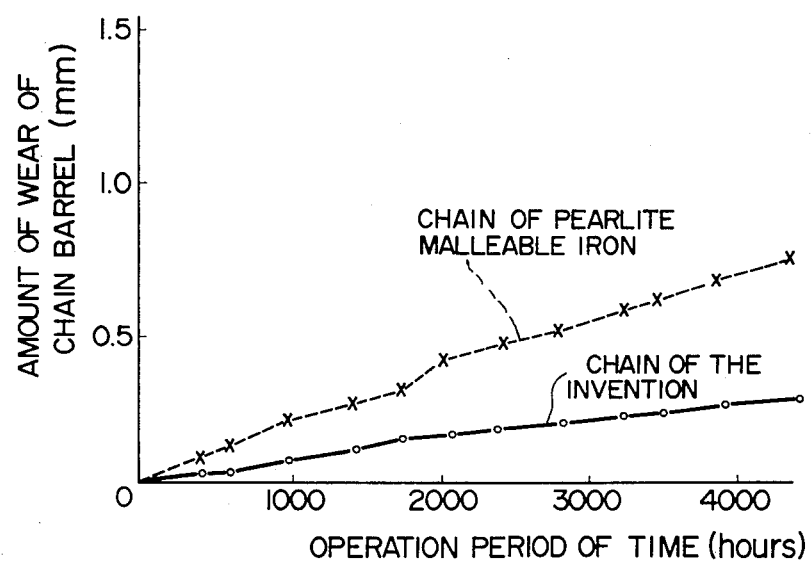
FIG. 8 is a graph showing the result of a wear test.

A comparison was made between the detachable chain link of the invention and a conventional chain made of pearlite malleable cast iron. As will be seen from FIG. 8 which shows the result of the wear test, the chain composed of the detachable chain link of the invention exhibits a superior wear resistance as compared with the conventional articles.

(7) Weight

A chain composed of 20 pieces of chain link of the invention weighs 23.6 kg, whereas a conventional chain made of pearlite malleable cast iron weighs 28.8 kg. This means that the weight of the chain of the invention can be reduced by about 18% for an equal strength.

(8) Other Properties

Other properties of the chain composed of the chain links in accordance with the invention are shown in Table 7 below, in comparison with the properties of the conventionally used chain composed of chain links made of pearlite malleable cast iron (FCM P50).

TABLE 7

| Items | Conventional chain | Chain of Invention |
|---|---|---|
| Material symbol | FCMP 50 | NMS-100BA |
| Tensile strength | 50 kg/mm$^2$ or higher | 100 kg/mm$^2$ or higher |
| Proof stress | 31 kg/mm$^2$ or higher | 65 kg/mm$^2$ or higher |
| Elongation | 4% or greater | 10% or greater |
| Hardness | HV 175 to 241 | HV 301 to 339 |
| Barrel hardness | HV 425 or greater | HV 301 to 339 |
| Chain pitch | 152.4 mm | 152.4 mm |
| Barrel diameter | 38.1 mm | 35 mm |
| Diameter of pin | 19 mm | 16 mm |
| Barrel wall thickness | 9.05 mm | 9 mm |
| Sprocket teeth width | 29 mm | 27 mm |
| Mean rupture strength | 19,000 kg | 10,000 kg |
| Weight | 1.44 kg/l | 0.78 kg/l |
| Service life | approx. 8 to 10 years | 10 years or longer |

As will be seen from Table 7, the chain composed of the detachable chain link of the invention exhibits a mean rupture strength of 10,000 kg, which is about a half that (19,000 kg) of the conventional chain. However, the slurry scraping capacity of the chain, when used in a sedimentation basin of a sewage treatment system, is not reduced substantially because the tensile strength is increased to a double while the weight is reduced to a half. The work for connecting and disconnecting the chain links for assembly and disassembly of the chain, as well as handling, is very much facilitated partly because the weight of the chain link is reduced and partly because no connecting pin is used.

The detachable chain in accordance with the invention offers the following advantages.

(1) The chain link exhibits superior self-lubricating property and high affinity by virtue of the fact that the material of the chain link contains nodular graphite structure. In consequence, the service life of the sprocket wheel is improved remarkably.

(2) The bainite-austenite matrix structure ensures superior mechanical properties.

(3) The wear resistance of the sprocket wheel is further improved by the work-hardening due to contact with the sprocket wheel.

(4) The application field thereof is remarkably increased by virtue of improvement in the mean rupture strength.

As will be understood from the foregoing description, according to the invention, the detachable chain in accordance with the invention exhibits a large mean rupture strength, as well as high wear resistance, thus meeting the major requirements for the detachable chain. This effect is very remarkable from an industrial point of view.

What is claimed is:

1. A detachable chain comprising chain links of an integrated construction produced by casting, each of said chain links being made of nodular graphite cast iron having a matrix constituted by a mixture structure of bainite and austenite, said chain having a tensile strength of not less than 100 Kgf/mm$^2$, a proof stress of not less than about 65 Kgf/mm$^2$, and an elongation of not less than 10%.

2. A method of forming a detachable chain comprising integrally constructed chain links disposed to detachably receive one another and form said chain, said method comprising the steps of:
   forming said chain links by casting a nodular graphite cast iron composition characterized by the inclusion of about 3.5 to about 3.7 wt % C, about 2.0 to about 2.5 wt % Si, about 0.3 to about 0.4 wt % Mn, and about 0.03 to about 0.05 wt % Mg;
   holding said chain links at a temperature of about 870° C. for about two hours;
   quenching said chain links to a temperature of about 380° C. and holding said chain links at said temperature for about one hour; and
   cooling said chain links to room temperature so that said chain links have a matrix comprised of a mixture of austenite and bainite and improved wear resistance properties.

* * * * *